US011025808B2

(12) United States Patent
Ikeda et al.

(10) Patent No.: US 11,025,808 B2
(45) Date of Patent: Jun. 1, 2021

(54) CONTROL APPARATUS AND CONTROL METHOD

(71) Applicant: SONY CORPORATION, Tokyo (JP)

(72) Inventors: Hiroshi Ikeda, Tokyo (JP); Seijiro Inaba, Kanagawa (JP); Nobuho Ikeda, Kanagawa (JP); Hideyuki Sato, Chiba (JP)

(73) Assignee: Sony Corporartion, Tokyo (JP)

( * ) Notice: Subject to any disclaimer, the term of this patent is extended or adjusted under 35 U.S.C. 154(b) by 0 days.

(21) Appl. No.: 15/777,801

(22) PCT Filed: Sep. 13, 2016

(86) PCT No.: PCT/JP2016/077004
§ 371 (c)(1),
(2) Date: May 21, 2018

(87) PCT Pub. No.: WO2017/094317
PCT Pub. Date: Jun. 8, 2017

(65) Prior Publication Data
US 2018/0352148 A1 Dec. 6, 2018

(30) Foreign Application Priority Data
Dec. 2, 2015 (JP) .............................. JP2015-235467

(51) Int. Cl.
*H04N 5/232* (2006.01)
*H04N 5/225* (2006.01)
(Continued)

(52) U.S. Cl.
CPC ........... *H04N 5/2258* (2013.01); *G06T 7/292* (2017.01); *H04N 5/23218* (2018.08);
(Continued)

(58) Field of Classification Search
CPC .............. H04N 5/23299; H04N 5/232; H04N 5/23296; H04N 7/181; G06T 7/292; G03B 13/36; G03B 15/00
See application file for complete search history.

(56) References Cited

U.S. PATENT DOCUMENTS 5,742,043 A * 4/1998 Knowles .................. G06K 7/10
235/462.3
7,483,049 B2 * 1/2009 Aman ................ A63B 24/0021
348/162
(Continued)

FOREIGN PATENT DOCUMENTS

CN 104601878 A 5/2015
CN 104683689 A 6/2015
(Continued)

OTHER PUBLICATIONS

International Search Report and Written Opinion of PCT Application No. PCT/JP2016/077004, dated Nov. 22, 2016, 15 pages of English Translation and 11 pages of ISRWO.
(Continued)

*Primary Examiner* — Jonathan R Messmore
(74) *Attorney, Agent, or Firm* — Chip Law Group

(57) ABSTRACT

There is provided a control apparatus including: a processing unit configured to decide, on a basis of object information indicating a state of an object, a plurality of imaging devices that image the objects such that each of all the objects included in a predetermined area imaged by the plurality of imaging devices falls within an angle of view at which the at least two or more imaging devices perform imaging, and control each of the plurality of imaging devices.

16 Claims, 10 Drawing Sheets

(51) Int. Cl.
*G06T 7/292* (2017.01)
*H04N 7/18* (2006.01)

(52) U.S. Cl.
CPC ..... *H04N 5/23296* (2013.01); *H04N 5/23299* (2018.08); *H04N 5/232061* (2018.08); *H04N 7/181* (2013.01); *G06T 2207/30224* (2013.01); *G06T 2207/30228* (2013.01)

(56) References Cited

U.S. PATENT DOCUMENTS

| | | | | |
|---|---|---|---|---|
| 9,843,718 | B2* | 12/2017 | Zerfass | H04N 5/23222 |
| 2003/0103149 | A1 | 6/2003 | Kinjo et al. | |
| 2004/0263625 | A1* | 12/2004 | Ishigami | G08B 13/19608 |
| | | | | 348/152 |
| 2011/0128387 | A1* | 6/2011 | Gans | H04N 7/181 |
| | | | | 348/169 |
| 2011/0158478 | A1* | 6/2011 | Yamada | G02B 6/0006 |
| | | | | 382/103 |
| 2014/0219506 | A1* | 8/2014 | Foltin | G06K 9/00825 |
| | | | | 382/104 |
| 2015/0116501 | A1* | 4/2015 | McCoy | H04N 5/23206 |
| | | | | 348/169 |
| 2015/0146011 | A1 | 5/2015 | Tsubusaki | |
| 2016/0063731 | A1* | 3/2016 | Yamamoto | H04N 7/181 |
| | | | | 348/159 |

FOREIGN PATENT DOCUMENTS

| | | | |
|---|---|---|---|
| JP | 2003-289465 | A | 10/2003 |
| JP | 2007-134845 | A | 5/2007 |
| JP | 2011-135247 | A | 7/2011 |
| JP | 2015-89119 | A | 5/2015 |
| JP | 2015-102853 | A | 6/2015 |
| WO | 2014/155979 | A1 | 10/2014 |

OTHER PUBLICATIONS

International Preliminary Report on Patentability of PCT Application No. PCT/JP2016/077004, dated Jun. 14, 2018, 16 pages of English Translation and 8 pages of IPRP.
Office Action for CN Patent Application No. 201680068918.7, dated Jul. 15, 2020, 9 pages of Office Action and 12 pages of English Translation.

* cited by examiner

|  | PLAYER 1 | PLAYER 2 | ... | PLAYER M | BALL |
|---|---|---|---|---|---|
| IMAGING DEVICE 1 | ○ |  |  | ○ | ○ |
| IMAGING DEVICE 2 | ○ | ○ | ○ |  | ○ |
| IMAGING DEVICE 3 |  | ○ |  | ○ | ○ |
| ⋮ |  |  |  |  |  |
| IMAGING DEVICE N | ○ |  |  |  |  |

|  | GROUP 1 | GROUP 2 | ... | GROUP M |
|---|---|---|---|---|
| IMAGING DEVICE 1 | ○ |  |  | ○ |
| IMAGING DEVICE 2 | ○ | ○ | ○ |  |
| IMAGING DEVICE 3 |  | ○ |  | ○ |
| ⋮ |  |  |  |  |
| IMAGING DEVICE N |  | ○ |  |  |

# CONTROL APPARATUS AND CONTROL METHOD

CROSS REFERENCE TO RELATED APPLICATIONS

This application is a U.S. National Phase of International Patent Application No. PCT/JP2016/077004 filed on Sep. 13, 2016, which claims priority benefit of Japanese Patent Application No. JP 2015-235467 filed in the Japan Patent Office on Dec. 2, 2015. Each of the above-referenced applications is hereby incorporated herein by reference in its entirety.

TECHNICAL FIELD

The present disclosure relates to a control apparatus, a control method, and a program.

BACKGROUND ART

The technology has been developed that tracks and images an object by controlling two imaging devices. Examples of the technology that controls, on the basis of captured images acquired from the two imaging devices equipped with pan heads, the pan heads to track an object include the technology described in Patent Literature 1 below.

CITATION LIST

Patent Literature

Patent Literature 1: JP 2003-97914A

DISCLOSURE OF INVENTION

Technical Problem

For example, for various purposes of analyzing games of sports, preventing crimes, improving the safety of mobile objects such as cars, or the like, captured images (moving images or still images) taken by each of a plurality of imaging devices are used.

To achieve the various purposes as described above, it is considered to be important for the plurality of imaging devices to image all the predetermined objects included in an area (which will be referred to as "predetermined area" below in some cases) to be imaged by the imaging devices. Examples of the above-described predetermined area include a "court or grounds (example in the case of the purpose of analyzing games of sports)," a "space in which crime preventing measures are taken (example in the case of the purpose of preventing crimes)," a "space in the advancing direction of a mobile object (example in the case of improving the safety of a mobile object)," or the like. In addition, examples of the above-described predetermined objects include "one or both of a player and a ball (example in the case of the purpose for analyzing games of sports)," a "person (example in the case of the purpose for preventing crimes)," "any object (example in the case of the purpose for improving the safety of a mobile object)," or the like.

Here, examples of a method for imaging all the predetermined objects included in the predetermined area include a method that uses a plurality of imaging devices (which will be referred to as "solid-state imaging devices" below) having the imaging positions and imaging directions fixed.

However, in the case where the existing method that uses the above-described solid-state imaging devices is used, the imaging position and imaging direction of each of the solid-state imaging devices is fixed, and thus it is not necessarily possible for all the solid-state imaging devices to image the predetermined objects. Therefore, in the case where the existing method that uses the above-described solid-state imaging devices is used, it can be impossible to efficiently image the predetermined objects.

The present disclosure proposes a novel and improved control apparatus, control method, and program that enable a plurality of imaging devices to more efficiently image objects included in a predetermined area.

Solution to Problem

According to the present disclosure, there is provided a control apparatus including: a processing unit configured to decide, on a basis of object information indicating a state of an object, a plurality of imaging devices that image the objects such that each of all the objects included in a predetermined area imaged by the plurality of imaging devices falls within an angle of view at which the at least two or more imaging devices perform imaging, and control each of the plurality of imaging devices.

In addition, according to the present disclosure, there is provided a control method that is executed by a control apparatus, the control method including: a step of deciding, on a basis of object information indicating a state of an object, a plurality of imaging devices that image the objects such that each of all the objects included in a predetermined area imaged by the plurality of imaging devices falls within an angle of view at which the at least two or more imaging devices perform imaging, and controlling each of the plurality of imaging devices.

In addition, according to the present disclosure, there is provided a program for a computer to execute: a function of deciding, on a basis of object information indicating a state of an object, a plurality of imaging devices that image the objects such that each of all the objects included in a predetermined area imaged by the plurality of imaging devices falls within an angle of view at which the at least two or more imaging devices perform imaging, and controlling each of the plurality of imaging devices.

Advantageous Effects of Invention

According to the present disclosure, it is possible to cause a plurality of imaging devices to more efficiently image an object included in a predetermined area.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
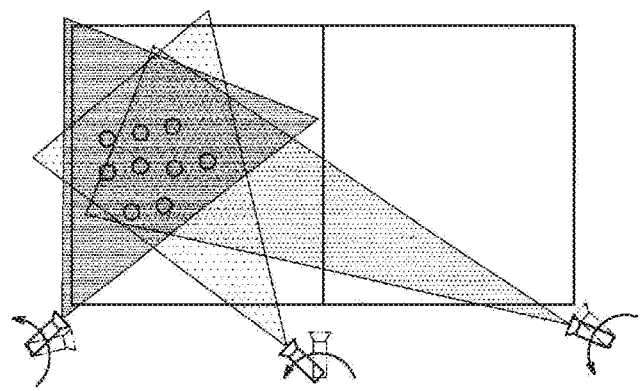
FIG. 1 is an explanatory diagram illustrating an example of a control result of an imaging device according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be made below in the following order.
1. Control Method according to the Present Embodiment
2. Control Apparatus according to the Present Embodiment
3. Program according to the Present Embodiment
(Control Method According to the Present Embodiment)

First, a control method according to the present embodiment will be described. The following shows the case where the processing of the control method according to the present embodiment is performed by a control apparatus according to the present embodiment as an example.

The following chiefly shows the case where the control method according to the present embodiment is applied to control over a plurality of imaging devices that image a space, for example, a court, grounds, or the like in which sports are played as an example. In addition, the following shows the case where the above-described sports are soccer as an example. Note that the control method according to the present embodiment is applicable to control over a plurality of imaging devices that image a space in which various sports are played such as "ball games including tennis, basketball, rugby, and the like" and "non-ball games including kabaddi and the like."

Note that an application example of the control method according to the present embodiment is not limited to control over a plurality of imaging devices that image a space in which the above-described sports are played. For example, the control method according to the present embodiment is applicable to control over various imaging devices such as control over a plurality of imaging devices serving as security cameras, and control over a plurality of imaging devices mounted on a mobile object including a car or the like.

[1] Overview of Control Method According to the Present Embodiment

As described above, in the case where the existing method that uses the solid-state imaging devices is used, it can be impossible to efficiently image the predetermined objects.

In addition, in the case where the existing method that uses solid-state imaging devices is used, it is not necessarily possible for all the solid-state imaging devices to image predetermined objects, but, for example, the following demerits are more conspicuous with increase in the number of imaging devices.

Increased cost of overall system

More complicated installation and setting of apparatuses such as imaging devices (e.g., in the case where a predetermined area is a court or grounds, or the like)

Increased load of processing captured images

Increased load of managing and recording captured images

Then, the control apparatus according to the present embodiment controls each of a plurality of imaging devices (control processing) such that each of all the predetermined objects included in a predetermined area falls within the angle of view at which at least two or more imaging devices perform imaging.

The control apparatus according to the present embodiment performs, as control over each of the plurality of imaging devices, for example, one or both of control over the imaging direction of each of the plurality of imaging devices, and control over the magnification or reduction of an object imaged by each of the plurality of imaging devices.

Here, examples of the control over the imaging directions of the imaging devices include control over one or two or more of the pan directions, tilt directions, and roll directions of the imaging devices. For example, the control apparatus according to the present embodiment transmits, to pan heads physically connected to the imaging devices and each capable of being movable in the pan direction, the tilt direction, and the roll direction, control signals that control the operation of the pan heads, and controls the operations of the pan heads. The control apparatus according to the present embodiment transmits the above-described control signals, for example, via a communication unit (described below) or a connected external communication device. The control apparatus according to the present embodiment controls the operation of the pan heads to be capable of changing one or two or more of the pan directions, tilt directions, and roll directions of the imaging devices, thereby controlling the imaging directions of the imaging devices.

In addition, examples of the control over the magnification or reduction of objects in imaging performed by the imaging devices include control over the zooming of the imaging devices. For example, the control apparatus according to the present embodiment transmits, to the imaging devices, control signals that control the operations of the imaging devices, and controls the zooming operations of the imaging devices to control the magnification or reduction of objects in imaging performed by the imaging devices. The control apparatus according to the present embodiment transmits the above-described control signals, for example, via a communication unit (described below) or a connected external communication device.

Note that the control over each of the imaging devices according to the present embodiment is not limited to the above-described examples.

For example, it is also possible as the control over each of the plurality of imaging devices for the control apparatus according to the present embodiment to further perform control over the position of the imaging device.

The position of an imaging device is acquired, for example, on the basis of a detection result of a sensor that is included in the imaging device and usable to identify the position, or a sensor that is connected to the imaging device and usable to identify the position. Here, examples of the above-described sensors usable to identify positions include one or two or more of a global navigation satellite system (GNSS) device, and motion sensors such as an acceleration sensor and an angular velocity sensor.

In addition, the positions of the imaging devices may be identified, for example, on the basis of captured images (moving images or still images) generated by the imaging devices performing imaging. For example, the case where the plurality of imaging devices image soccer grounds is shown as an example. It is possible to compute the positions and attitudes of the imaging devices by using lines, intersections, or the like of the grounds included in captured images. Here, the positions and attitudes of the imaging devices may be computed on the basis of the relationship between the imaging devices (method for performing computation by using the structure-from-motion technology), or the position of each imaging device may be computed by using the fact that the shape of the grounds is known (method for performing computation by solving the Perspective-n-Point problem).

Examples of the control over the position of an imaging device include control over the movement of a mobile device physically connected to the imaging device (in the case where the imaging device does not have a function of moving), or control over the movement of an imaging device having a function of moving. Examples of the above-described mobile device include a mobile object (e.g., train or the like) that moves on a predetermined route such as a rail, a mobile object (e.g., robot or the like) that moves on any route, or the like. In addition, examples of the imaging device having a function of moving include an unmanned air vehicle called a drone, a mobile object (e.g., robot or the like) including an imaging device that moves on any route, or the like.

For example, the control apparatus according to the present embodiment transmits a control signal that controls the operation of a mobile device to the mobile device to control the movement of the mobile device. The control apparatus according to the present embodiment transmits the above-described control signals, for example, via a communication unit (described below) or a connected external communication device. The control apparatus according to the present embodiment controls the movement of a mobile device to be capable of changing the position of the mobile device, thereby controlling the position of the imaging device.

In addition, for example, the control apparatus according to the present embodiment transmits a control signal that controls the operation of an imaging device to the imaging device to control the position of the imaging device. The control apparatus according to the present embodiment transmits the above-described control signals, for example, via a communication unit (described below) or a connected external communication device.

The control apparatus according to the present embodiment performs, as described above, for example, one or both of control over the imaging direction of each of the plurality of imaging devices, and control over the magnification or reduction of an object imaged by each of the plurality of imaging devices. In addition, for example, as described above, the control apparatus according to the present embodiment is capable of further controlling the position of an imaging device. That is, an imaging device to be controlled by the control apparatus according to the present embodiment can be an imaging device that does not have the "imaging direction," or the "imaging position and imaging direction" fixed.

Figure 2:
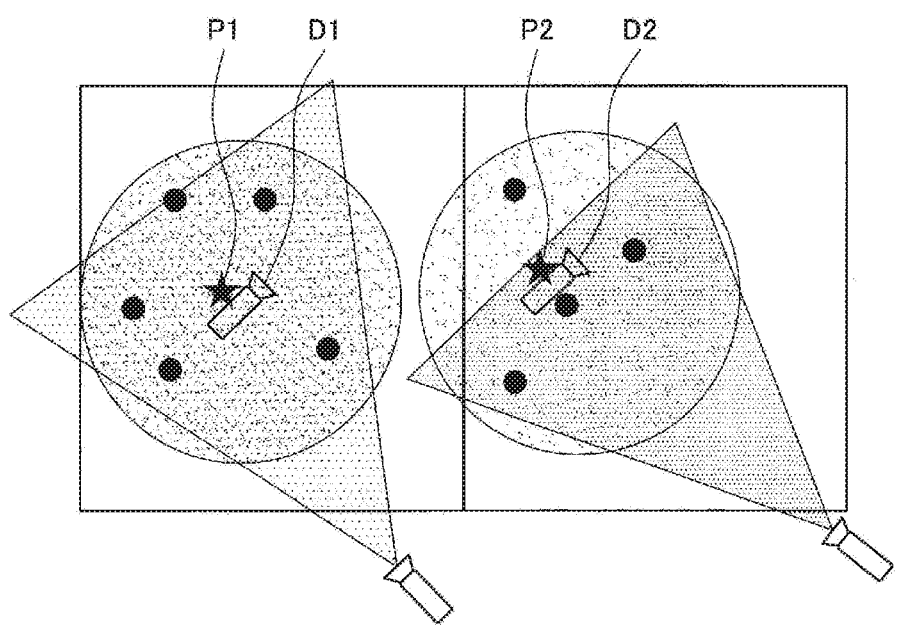
FIG. 2 is an explanatory diagram illustrating an example of a control result of the imaging device according to the present embodiment.

FIGS. 1 and 2 are explanatory diagrams each illustrating an example of a control result of an imaging device according to the present embodiment. FIG. 1 illustrates an example of a plurality of imaging devices that image soccer grounds (example of the predetermined area). FIG. 2 illustrates another example of a plurality of imaging devices that image soccer grounds. In addition, P1 illustrated in FIG. 2 represents the center-of-gravity position of a predetermined object that is imaged by a movable imaging device D1 illustrated in FIG. 2. P2 illustrated in FIG. 2 represents the center-of-gravity position of a predetermined object that is imaged by a movable imaging device D2 illustrated in FIG. 2.

The control apparatus according to the present embodiment controls each imaging device to change the imaging direction of the imaging device, and the magnification and reduction of an object in imaging performed by the imaging device in accordance with the position of a player or the like (example of the predetermined objects), for example, as illustrated in FIG. 1. In addition, for example, in the case there is a movable imaging device as illustrated in FIG. 2, the control apparatus according to the present embodiment controls each imaging device to change the position of the movable imaging device in accordance with the position of a player or the like (example of the predetermined objects). Here, in the case where the grounds are imaged from right above like the imaging devices D1 and D2 illustrated in FIG. 2, it is possible to further decrease the possibility of occlusion.

Therefore, the control apparatus according to the present embodiment controls each imaging device to enable all the imaging devices to image the predetermined objects.

Thus, the control apparatus according to the present embodiment makes it possible by performing the control processing of the control method according to the present embodiment to cause a plurality of imaging devices to image objects included in the predetermined area more efficiently than in the case where the existing method that uses solid-state imaging devices is used.

In addition, the control apparatus according to the present embodiment performs the control processing of the control method according to the present embodiment, and can thus dynamically change the imaging range of each imaging device. Therefore, in the case where the control processing of the control method according to the present embodiment is used, it is possible to image the predetermined objects included in the predetermined area with less imaging devices than in the case where the existing method that uses solid-state imaging devices is used.

Thus, in the case where the control processing of the control method according to the present embodiment is used, it is possible to further decrease the above-described demerits that can be observed in the case where the existing method which uses solid-state imaging devices is used.

Note that the control processing according to the present embodiment is obtained by dividing the processing of the control method according to the present embodiment for the sake of convenience. Therefore, it is also possible to interpret that, as the processing of the control method according to the present embodiment, for example, the control processing according to the present embodiment includes two or more kinds of processing (depending on any methods for division).

The following describes the control processing of the control method according to the present embodiment.

[2] Control Processing of Control Method According to the Present Embodiment

[2-1] Overview of Control Processing

Figure 3A:
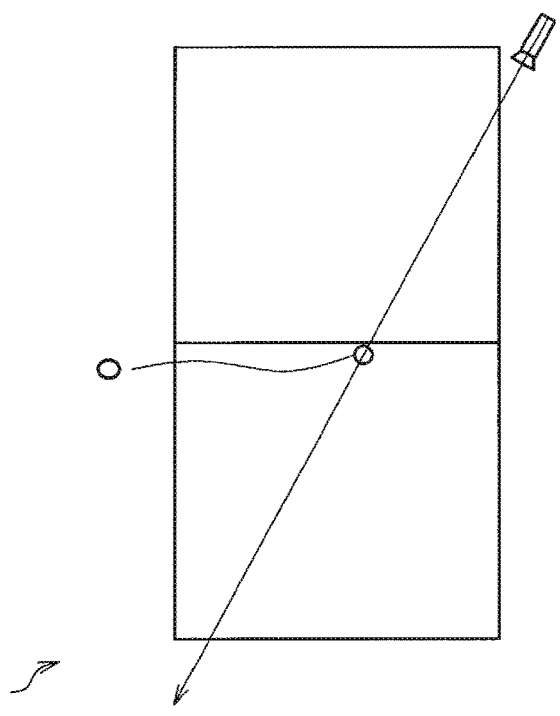
FIGS. 3A and 3B are explanatory diagrams for describing an overview of control processing of a control method according to the present embodiment.
Figure 3B:
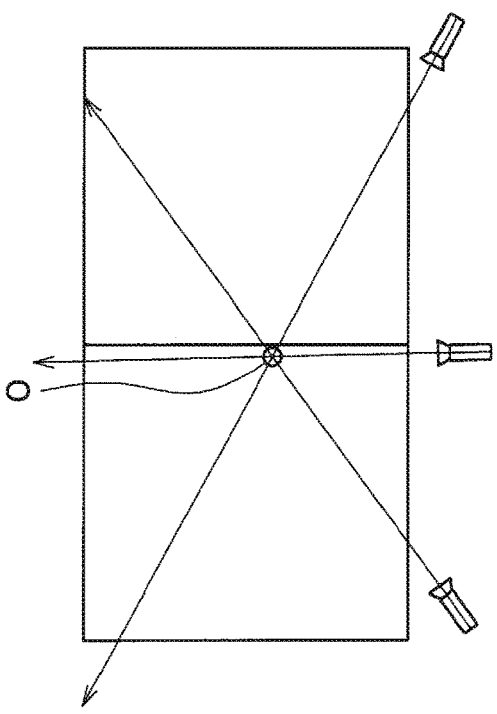

First, the overview of the control processing according to the present embodiment will be described. FIGS. 3A and 3B are explanatory diagrams for describing the overview of the control processing of the control method according to the present embodiment.

In the case where an object O is imaged by one imaging device as illustrated in FIG. 3A, it is not possible to obtain the position of the object O from a captured image. In contrast, in the case where the object O is imaged by two or more imaging devices (FIG. 3B illustrates an example in which three imaging devices perform imaging) as illustrated in FIG. 3B, for example, the use of triangulation makes it possible to obtain the position of the object O from captured images.

Then, the control apparatus according to the present embodiment decides a plurality of imaging devices that image a predetermined object, and controls each of the plurality of imaging devices. The control apparatus according to the present embodiment decides a plurality of imaging devices that image the predetermined objects, for example, on the basis of object information, such that all the predetermined objects included in the predetermined area fall within the angle of view at which at least two or more imaging devices perform imaging.

Here, the object information according to the present embodiment is data indicating the state of a predetermined object. The state of the predetermined object according to the present embodiment will be described below.

The object information according to the present embodiment is generated, for example, on the basis of a captured image acquired from each of a plurality of imaging devices. The processing of generating the object information may be performed by the control apparatus according to the present embodiment, or an external apparatus of the control apparatus according to the present embodiment such as a server.

For example, the control apparatus according to the present embodiment "generates object information on the basis of a captured image acquired from each of a plurality of imaging devices," or "transmits a transmission request including an instruction to transmit the object information to an external apparatus such as a server, and receives the object information from the external apparatus" to acquire the object information. The control apparatus according to the present embodiment uses, for example, a communication unit (described below) included in the control apparatus according to the present embodiment, or an external communication device connected to the control apparatus according to the present embodiment to communicate with the external apparatus. The following generically refers to the above-described processing of generating object information and acquiring the object information, and the above-described processing of transmitting a transmission request and acquiring the object information as "acquisition processing" in some cases.

Note that the method for the control apparatus according to the present embodiment to acquire object information is not limited to the control apparatus according to the present embodiment performing acquisition processing. For example, in the case where object information is generated by the external apparatus such as a server, it is also possible for the control apparatus according to the present embodiment to acquire the object information that the external apparatus takes the initiative in transmitting by actively receiving the object information.

That is, it is possible for the control apparatus according to the present embodiment to perform control processing, for example, on the basis of object information acquired by performing acquisition processing as the processing of the control method according to the present embodiment, and also perform control processing on the basis of object information actively acquired from the external apparatus.

In addition, the predetermined area is an area that a plurality of imaging devices are capable of imaging. The predetermined area corresponds to an area to be imaged by the imaging devices as described above.

As an example, the case will be shown where the control method according to the present embodiment is applied to control over a plurality of imaging devices that image a space in which sports are played. Examples of the predetermined area include a space such as a court or grounds in which sports are played. In addition, in the case where the control method according to the present embodiment is applied to control over a plurality of imaging devices that image a space in which sports are played, the predetermined area may be, for example, the whole of an area such as a court or grounds, or a part of an area such as a court or grounds. Note that, needless to say, examples of the predetermined area according to the present embodiment are not limited to the above-described examples.

In addition, a predetermined object is an object to be detected among objects included in a captured image obtained by imaging the predetermined area.

The control apparatus according to the present embodiment uses, for example, the predetermined objects detected from respective captured images acquired when "plurality of imaging devices are each caused to enter the initial state in which the whole of the predetermined area is imaged by the plurality of imaging devices" as all the predetermined objects according to the present embodiment. In the case where an imaging device is caused to enter the initial state, an ID is assigned to each of the predetermined objects detected from the respective captured images. The ID for a predetermined object may be automatically assigned to a predetermined object detected according to image processing that uses any object detection technology, or manually assigned on the basis of an operation of a user. An example of the initial state of an imaging device according to the present embodiment will be described below.

In addition, in the case where object information transmitted from the external apparatus such as a server is received, the control apparatus according to the present embodiment may use, for example, the respective predetermined objects indicated by the object information acquired from the external apparatus as all the predetermined objects according to the present embodiment. The following chiefly describes the case where all the predetermined objects according to the present embodiment are the predetermined objects detected from respective captured images acquired when imaging devices are caused to enter the initial states.

As an example, the case will be shown where the control method according to the present embodiment is applied to control over a plurality of imaging devices that image a space in which sports are played. Examples of the predetermined objects include one or both of a player and a ball (example of the predetermined objects in the case where ports are ball games).

Here, in the case where the predetermined objects are a player and a ball, the image size of the player included in a captured image is larger than the image size of the ball included in the captured image in many cases because the ball is smaller than the player. In addition, in the case where the predetermined objects are a player and a ball, the movement of the ball is faster than the movement of the player in many cases. Therefore, considering processing of tracking the predetermined objects (which will be referred to as "tracking processing"), in the case where the predetermined objects are a player and a ball, it can be more difficult to track the ball on the basis of a captured image than to track the player on the basis of the captured image.

The control processing according to the present embodiment is performed to control each of a plurality of imaging devices such that each of all the predetermined objects falls within the angle of view at which at least two or more imaging devices perform imaging as described above. Therefore, the control processing according to the present embodiment is performed, so that it can be easier to track the predetermined objects in the tracking processing based on captured images.

Note that, needless to say, examples of the predetermined objects according to the present embodiment are not limited to the above-described examples.

As described above, the control apparatus according to the present embodiment performs, as control over each of the plurality of imaging devices, for example, one or both of control over the imaging direction of each of the plurality of imaging devices, and control over the magnification or reduction of an object imaged by each of the plurality of imaging devices. The control apparatus according to the present embodiment controls an imaging device, for example, as shown in (a) to (c) below.

(a) Control Over Image Size of Object to be Imaged (Example of Control Over Magnification or Reduction of Object in Imaging Performed by Imaging Device)

Figure 4A:
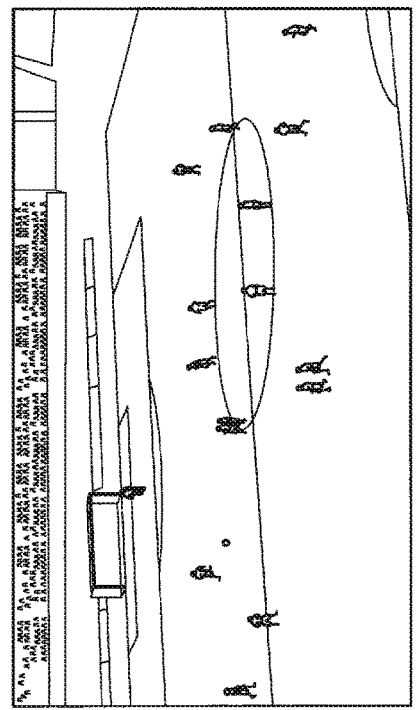
FIGS. 4A and 4B are explanatory diagrams illustrating an example of a captured image according to the present embodiment.
Figure 4B:
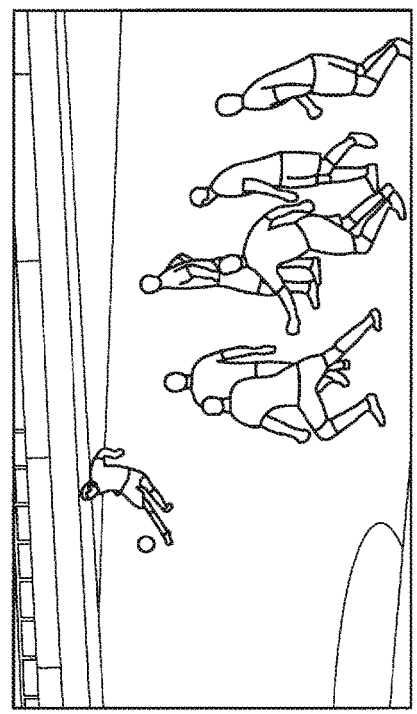

FIGS. 4A and 4B are explanatory diagrams illustrating an example of a captured image according to the present embodiment. FIG. 4A illustrates an example of a captured image obtained by imaging soccer grounds (example of the predetermined area). FIG. 4B illustrates another example of a captured image obtained by imaging soccer grounds.

For example, in the case where players (example of the predetermined objects: the same applied to the following) included in a captured image are small as illustrated in FIG. 4A, it can be impossible, for example, to detect any player from the captured image, distinguish the detected players, or the like. Therefore, for example, in the case where the players included in the captured image are small as illustrated in FIG. 4A, the processing based on a captured image can be disturbed like it is impossible to track a player on the basis of a captured image, or the like.

Then, the control apparatus according to the present embodiment controls the magnification or reduction of objects in imaging performed by each of a plurality of imaging devices such that the predetermined objects included in the captured image have certain size or larger when imaged as illustrated in FIG. 4B.

Here, the control apparatus according to the present embodiment controls the magnification or reduction of the object in imaging performed by each of the plurality of imaging devices, for example, such that the image size of the entire predetermined objects or the image size of part of the predetermined objects is larger than set image size.

For example, in the case where a captured image includes a ball (example of the predetermined objects), the control apparatus according to the present embodiment controls the magnification or reduction of the object in imaging performed by each of a plurality of imaging devices such that the image size of the ball in the captured image has a size of about 20×20 [pixels] or larger. In addition, for example, in the case where a captured image includes one or two or more players (example of the predetermined objects), the control apparatus according to the present embodiment controls the magnification or reduction of the objects in imaging performed by each of a plurality of imaging devices such that the image size of the faces of all the players included in the captured image or the image size of the numbers assigned to the uniforms of all the players included in the captured image has a size of about 20×20 [pixels] or larger. In addition, for example, in the case where a captured image includes a ball (example of the predetermined objects) and one or two or more players (example of the predetermined objects), the control apparatus according to the present embodiment controls the magnification or reduction of the objects in imaging performed by each of a plurality of imaging devices such that the "image size of the ball in the captured image" and the "image size of the faces of all the players included in the captured image or the image size of the numbers assigned to the uniforms of all the players included in the captured image" have a size of about 20×20 [pixels] or larger.

The control apparatus according to the present embodiment controls the magnification or reduction of the object in imaging performed by each of the plurality of imaging devices, for example, as described above, in accordance with the types of the predetermined objects such that the image size of the entire predetermined objects or the image size of part of the predetermined objects is larger than set image size.

Here, which of the image size of the entire predetermined objects and the image size of part of the predetermined objects is set as a control standard is based, for example, on whether the predetermined objects are identified by identifying the entire predetermined objects or identifying part of the predetermined objects. For example, the above exemplifies the "case where players are identified on the basis of the faces (example of part of the predetermined objects) or the numbers (example of part of the predetermined objects) assigned to the uniform."

In addition, the above exemplifies a size of about 20×20 [pixels] as image size in control over the magnification or reduction of an object in imaging performed by each of a plurality of imaging devices. However, as long as it is possible to identify the predetermined objects, it is possible to employ any image size.

Note that, needless to say, in the control apparatus according to the present embodiment, an example of control over the magnification or reduction of an object in imaging performed by each of a plurality of imaging devices is not limited to the above-described examples.
(b) Control Over Amount of Change in State of Imaging Device (Examples of Control Over Imaging Direction of Imaging Device, Control Over Magnification or Reduction of Object in Imaging Performed by Imaging Device, and Control Over One or Two or More of Positions of Imaging Devices)

It takes time to complete changing the state (one or two or more of attitude, zoom, and position) of an imaging device. Therefore, for example, considering sports, the situation of a predetermined object such as a player or a ball like the position of the predetermined object, or the like can change before changing the state of the imaging device is completed.

In addition, when a small change in the situation of a predetermined object in the predetermined area considerably changes the state of an imaging device, the state transition of the imaging device can be unstable.

Figure 5B:
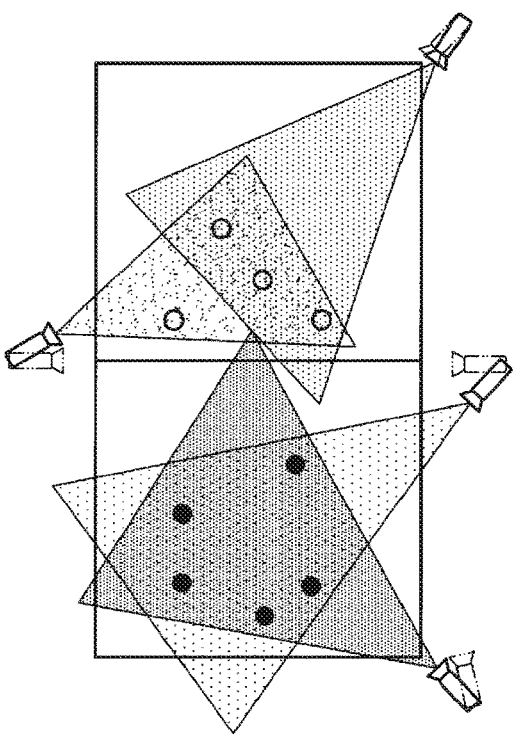
FIGS. 5A and 5B are explanatory diagrams illustrating an example of imaging ranges of a plurality of imaging devices according to the present embodiment.
Figure 5A:
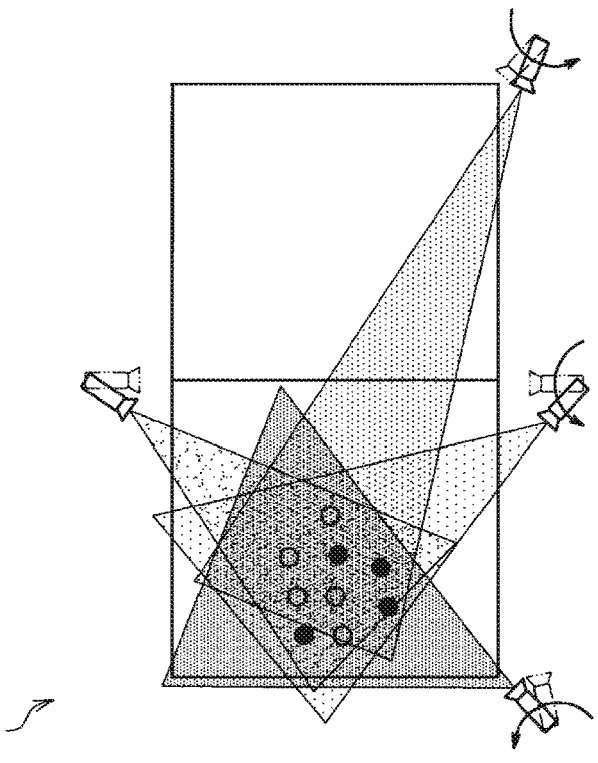

Therefore, the control apparatus according to the present embodiment, for example, provides hysteresis to changes in the state of an imaging device, places an upper limit on the amount of change in the state of an imaging device, combines them, or the like to control the amount of change in the state of the imaging device such that the current state of the imaging device smoothly changes.
(c) Control Over Allocation of Imaging Device that Images Predetermined Object FIGS. 5A and 5B are explanatory diagrams illustrating an example of the imaging ranges of a plurality of imaging devices according to the present embodiment. FIG. 5A illustrates an example of the imaging ranges of a plurality of imaging devices that image soccer grounds (example of the predetermined area). FIG. 5B illustrates another example of the imaging ranges of a plurality of imaging devices that image soccer grounds.

As described above, the control apparatus according to the present embodiment controls each of a plurality of imaging devices such that each of all the predetermined objects included in a predetermined area falls within the angle of view at which at least two or more imaging devices perform imaging.

Therefore, in the case where the predetermined objects unevenly exist in the predetermined area, for example, as illustrated in FIG. 5A, part of the area in which the predetermined objects in the predetermined area exist is imaged by all the imaging devices, and thus all the predetermined objects are imaged by at least two or more imaging devices. At this time, the zoom ratios (angles of view) of the imaging devices may be set to be the longest focal distance with which the predetermined objects imaged by the imaging devices are imaged as an exception to the control shown in (a) above.

In addition, in the case where the predetermined objects exist less unevenly in the predetermined area, for example, as illustrated in FIG. 5B, each of the predetermined objects is imaged by at least two or more imaging devices that have shorter distance to the predetermined object.
[2-2] Specific Example of Control Processing Next, the control processing of the control method according to the present embodiment will be described more specifically.

As described above, the control apparatus according to the present embodiment controls each of a plurality of imaging devices such that each of all the predetermined objects included in a predetermined area falls within the angle of view at which at least two or more imaging devices perform imaging. The control apparatus according to the present embodiment performs, for example, any of the processing in (1) below to the processing shown in (3) below to control each of the plurality of imaging devices.
(1) First Example of Control Processing The control apparatus according to the present embodiment decides, on the basis of one or both of the states of the predetermined objects indicated by object information and changes in the states of imaging devices, the plurality of imaging devices that image the respective predetermined objects, and controls each of the plurality of imaging devices.

The state of a predetermined object according the present embodiment is detected on the basis of a captured image. Here, examples of the state of a predetermined object according to the present embodiment include one or both of the size of the predetermined object and the degree of concentration of the predetermined object.

The size of a predetermined object according to the present embodiment is obtained, for example, on the basis of the image size of the predetermined object in a captured image.

Figure 6:
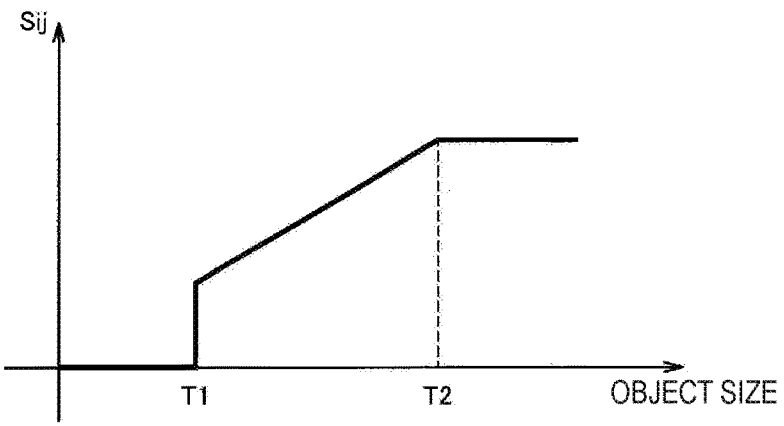
FIG. 6 is an explanatory diagram for describing an example of a function for obtaining size of a predetermined object according to the present embodiment.

FIG. 6 is an explanatory diagram for describing an example of a function for obtaining the size of a predetermined object according to the present embodiment. In FIG. 6, "object size" shown on the horizontal axis corresponds to the image size of a predetermined object. In addition, in FIG. 6, "$S_{ij}$" shown on the vertical axis corresponds to the size of a predetermined object that is denoted with a number j (j represents a positive integer) and imaged by an imaging device denoted with a number i (i represents a positive integer).

The control apparatus according to the present embodiment uses a function, for example, as illustrated in FIG. 6 to obtain the size of a predetermined object which corresponds to the image size of the predetermined object.

Note that the method for obtaining the size of a predetermined object according to the present embodiment is not limited to the above-described example.

For example, the control apparatus according to the present embodiment is capable of obtaining, on the basis of the distance between an imaging device and a predetermined object, the size of the predetermined object. The control apparatus according to the present embodiment uses, for example, the function of the reciprocal of the distance between the imaging device and the predetermined object, and the size of the predetermined object to obtain the size of the predetermined object which corresponds to the reciprocal of the distance between the imaging device and the predetermined object. In addition, the control apparatus according to the present embodiment is also capable of obtaining the size of the predetermined object which corresponds to the distance between the imaging device and the predetermined object, for example, by referring to a table (or a database) in which the distance is associated with the size.

The degree of concentration of a predetermined object according to the present embodiment is obtained, for example, on the basis of the distance between one predetermined object and the other predetermined objects in a captured image.

Figure 7A:
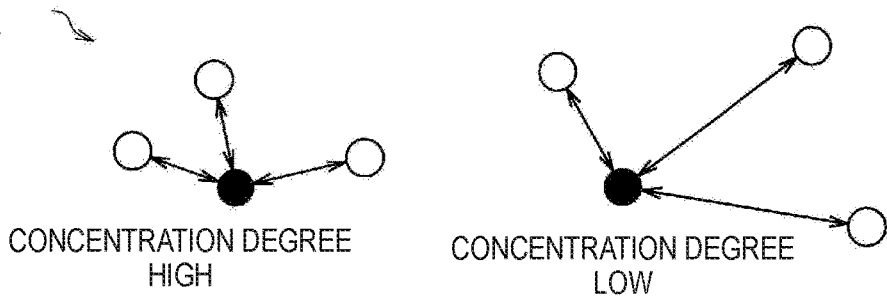
FIGS. 7A and 7B are explanatory diagrams for describing an example of a way of obtaining a degree of concentration of a predetermined object according to the present embodiment.
Figure 7B:
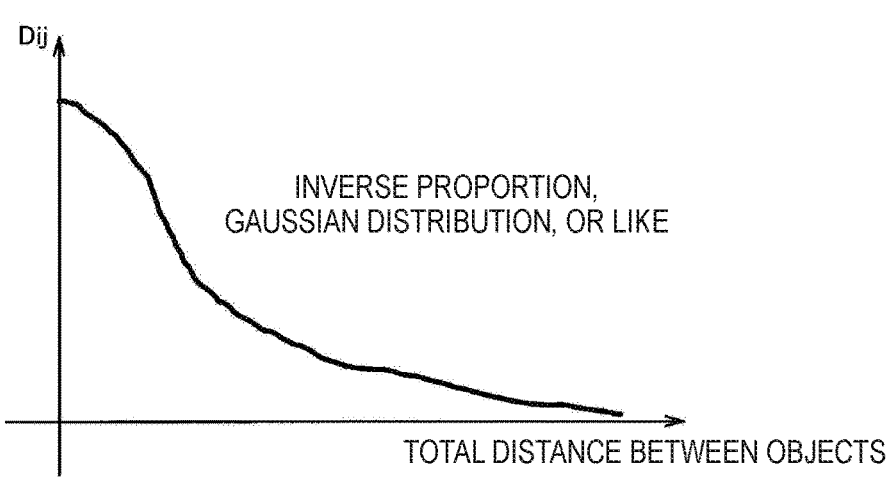

FIGS. 7A and 7B are explanatory diagrams for describing an example of a way of obtaining the degree of concentration of a predetermined object according to the present embodiment. FIG. 7A illustrates an example of the degree of concentration of a predetermined object. FIG. 7A illustrates an example of states in which the concentration degree is low, and the concentration degree is high. In addition, FIG.

7B illustrates an example of a function for obtaining the degree of concentration of a predetermined object. In FIG. 7B, the "total distance between objects" shown on the horizontal axis corresponds to the total distance between one predetermined object and the other predetermined objects in a captured image. In addition, in FIG. 7B, "Dij" shown on the vertical axis corresponds to the concentration degree of the predetermined object that is denoted with the number j and imaged by the imaging device denoted with the number i.

Here, the total distance between objects which is illustrated in FIG. 7B may be the total distance between the predetermined object denoted with the number j and all the other predetermined objects included in the predetermined area. In the case where the total distance between objects which is illustrated in FIG. 7B is set as the "total distance between the predetermined object denoted with the number j and all the other predetermined objects included in the predetermined area," the distance between the predetermined object denoted with the number j and predetermined objects (i.e., predetermined objects that are not included in a captured image) outside the angle of view of the imaging device denoted with the number i is considered to be "0" (zero).

In addition, a change in the state of the imaging device is represented as the amount of change which shows a change in the state of the imaging device. The amount of change which shows a change in the state of the imaging device is obtained by obtaining a weighting linear sum for each element, for example, on the basis of the respective amounts of change in the position of the imaging device, the attitude (roll, pitch, and yaw) of the imaging device, and the zooming (focal distance) of the imaging device.

More specifically, the control apparatus according to the present embodiment allocates an imaging device to each predetermined object such that each of all the predetermined objects falls within the angle of view at which at least two or more imaging devices perform imaging.

Figures 8, 9, 10:
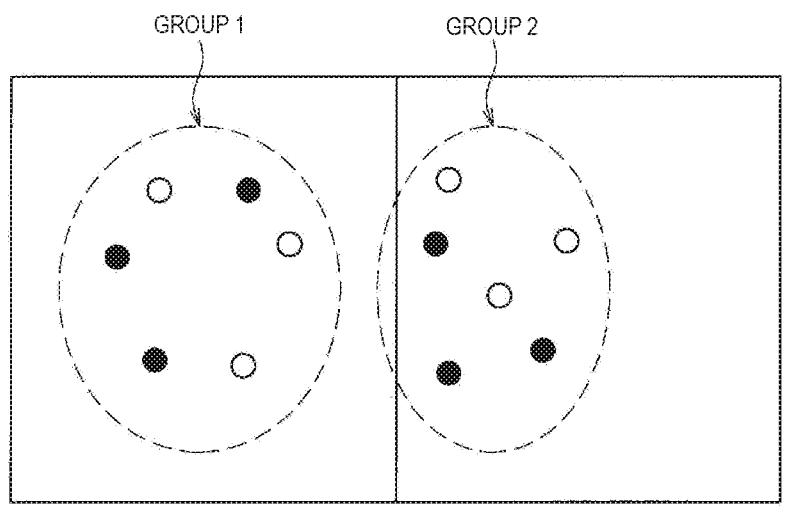
FIG. 8 is an explanatory diagram for describing an example of allocation of the imaging device to each predetermined object according to the present embodiment.
FIG. 9 is an explanatory diagram for describing an example in which the predetermined objects according to the present embodiment are grouped.
FIG. 10 is an explanatory diagram for describing an example of allocation of the imaging device to each group of predetermined objects according to the present embodiment.

FIG. 8 is an explanatory diagram for describing an example of the allocation of the imaging device to each predetermined object according to the present embodiment. FIG. 8 illustrates an example in which the predetermined objects are players and a ball. In addition, in FIG. 8, a combination of an imaging device and a predetermined object which is provided with "○" represents an imaging device allocated to a predetermined object.

When the control apparatus according to the present embodiment allocates an imaging device to each predetermined object, for example, as illustrated in FIG. 8, the control apparatus according to the present embodiment computes an evaluation value on the basis of one or both of the state of a predetermined object and a change in the state of an imaging device.

The control apparatus according to the present embodiment performs, for example, the calculation shown in the following expression 1 to compute an evaluation value F.

Here, the following expression 1 shows an example of calculation in the case where an evaluation value is computed on the basis of both the state of a predetermined object and a change in the state of an imaging device. "$S_{ji}$" shown in the expression 1 represents the size of a predetermined object, and "$D_{ji}$" shown in the expression 1 represents the concentration degree of a predetermined object. In addition, "$T_j$" shown in the expression 1 represents the amount of change in the state of an imaging device. In addition, "($W_S$, $W_D$, $W_T$)" shown in the expression 1 represent weights.

Note that "($W_S$, $W_D$, $W_T$)" shown in the expression 1 may have different values for respective predetermined objects.

[Math. 1]

$$F = \sum_{i=1}^{i=n}\left(W_S \cdot \sum_{j=1}^{j=m} S_{ij} + W_D \cdot \sum_{j=1}^{j=m} D_{ij} + W_T \cdot T_i\right)$$ (Expression 1)

Note that, needless to say, the method for computing an evaluation value according to the present embodiment is not limited to the example shown in the above-described expression 1.

When an evaluation value is computed, the control apparatus according to the present embodiment decides an imaging device that includes each predetermined object within the angle of view on the basis of the computed evaluation value.

The control apparatus according to the present embodiment computes an evaluation value for each of a plurality of different allocation patterns which satisfies, for example, the condition that "each of all the predetermined objects be imaged by at least two or more imaging devices." Then, the control apparatus according to the present embodiment decides an imaging device that images each predetermined object on the basis of the allocation pattern having the highest computed evaluation value among the plurality of computed evaluation values. That is, the control apparatus according to the present embodiment decides an imaging device that images each predetermined object such that a computed evaluation value is the highest.

Note that the method for deciding an imaging device that images each predetermined object on the basis of an evaluation value is not limited to the above-described example.

For example, in the case where a computed evaluation value is greater than a set threshold (or in the case where an evaluation value is greater than or equal to the threshold), the control apparatus according to the present embodiment may decide an imaging device that images each predetermined object with the allocation patter corresponding to the evaluation value. Examples of the above-described threshold for an evaluation value include a fixed threshold set in advance, or a variable threshold that is changeable on the basis of an operation of a user, or the like.

In the case where an imaging device that images each predetermined object is decided according to the threshold processing as described above, it can be possible to decide an imaging device that images each predetermined object in a shorter time than time required in the case where an imaging device that images each predetermined object is decided such that the above-described computed evaluation value is the highest.

For example, when an imaging device that images each predetermined object is decided as described above, the control apparatus according to the present embodiment controls each of a plurality of imaging devices, and causes each imaging device to image a decided predetermined object.

(2) Second Example of Control Processing

In the control processing according to the above-described first example, an example is shown in which an imaging device that images each predetermined object is decided by allocating an imaging device to each predetermined object. However, the control processing according to the present embodiment is not limited to the control processing according to the above-described first example.

For example, the control apparatus according to the present embodiment groups (or segments) the predetermined objects. Then, in the case where the predetermined objects are grouped, the control apparatus according to the present embodiment controls each of a plurality of imaging devices such that each group of predetermined objects falls within the angle of view at which at least two or more imaging devices perform imaging.

FIG. 9 is an explanatory diagram for describing an example in which the predetermined objects according to the present embodiment are grouped. FIG. 9 illustrates an example in which the predetermined objects included in the predetermined area are classified into two groups: a group 1; and a group 2.

The control apparatus according to the present embodiment groups the predetermined objects, for example, on the basis of the distance between one predetermined object and the other predetermined objects. In the case where the distance between the predetermined objects is less than a set threshold (or in the case where the distance between the predetermined objects is less than or equal to the threshold), the control apparatus according to the present embodiment groups these predetermined objects. Examples of the above-described threshold for grouping include a fixed threshold set in advance, or a variable threshold that is changeable on the basis of an operation of a user, or the like. In addition, in the case where the predetermined objects are grouped according to the method that uses the threshold processing as described above, there may be both groups each including a plurality of predetermined objects and groups each including one predetermined object.

Note that the method for grouping the predetermined objects according to the present embodiment is not limited to the method that uses the threshold processing as described above. The predetermined objects may be grouped according to any method capable of grouping the predetermined objects.

In the case where the predetermined objects are grouped, the control apparatus according to the present embodiment decides an imaging device that includes each group of predetermined objects within the angle of view on the basis of one or both of the state of a group of predetermined objects which is detected on the basis of a captured image, and a change in the state of an imaging device, and controls each of the plurality of imaging devices.

Here, examples of the state of a group of the predetermined objects according to the present embodiment include one or both of the size of the group of the predetermined objects and the degree of concentration of the group of the predetermined objects.

The size of a group of the predetermined objects according to the present embodiment is obtained, for example, on the basis of the image size of the group of the predetermined objects in a captured image. Similarly to the case where the control apparatus according to the present embodiment obtains the size of a predetermined object, for example, in the control processing according to the above-described first example, the control apparatus according to the present embodiment uses the function as illustrated in FIG. 6, or the like to obtain the size of a predetermined object which corresponds to the image size of a group of predetermined objects.

The degree of concentration of a group of predetermined objects according to the present embodiment is obtained, for example, on the basis of the total concentration degree of the predetermined objects belonging to the group, or the like.

More specifically, the control apparatus according to the present embodiment allocates an imaging device to each predetermined object such that each of all the groups of the predetermined objects falls within the angle of view at which at least two or more imaging devices perform imaging.

FIG. 10 is an explanatory diagram for describing an example of the allocation of the imaging device to each group of the predetermined objects according to the present embodiment. In FIG. 10, a combination of an imaging device and a group of the predetermined objects which is provided with "○" represents an imaging device allocated to the group of the predetermined objects.

When the control apparatus according to the present embodiment allocates an imaging device to each group of predetermined objects, for example, as illustrated in FIG. 10, the control apparatus according to the present embodiment computes an evaluation value on the basis of one or both of the state of the group of predetermined objects, and a change in the state of the imaging device.

The control apparatus according to the present embodiment performs calculation (e.g., calculation in which the respective elements in the above-described expression 1 are substituted with the state of the group of predetermined objects and a change in the state of the imaging device) similar to, for example, the calculation of an evaluation value in the control processing according to the above-described first example to compute an evaluation value.

When an evaluation value is computed, the control apparatus according to the present embodiment decides an imaging device that images each group of the predetermined objects on the basis of the computed evaluation value.

For example, similarly to the control processing according to the above-described first example, the control apparatus according to the present embodiment decides an imaging device that images each group of predetermined objects such that the computed evaluation value is the highest. In addition, for example, similarly to the control processing according to the above-described first example, the control apparatus according to the present embodiment is also capable of deciding an imaging device that images each group of predetermined objects according to threshold processing that uses a threshold for an evaluation value.

For example, when an imaging device that images each group of the predetermined objects is decided as described above, the control apparatus according to the present embodiment controls each of a plurality of imaging devices, and causes each imaging device to image a decided group of the predetermined objects.

In control processing according to a second example, processing in which a predetermined object in the control processing according to the first example is substituted with a group of predetermined objects as described above is performed. Therefore, in the case where the control processing according to the second example is performed, the number of groups of predetermined objects is less than or equal to the number of predetermined objects in the control processing according to the first example. Accordingly, it is possible to decrease the processing load as compared with that of the control processing according to the first example.

(3) Third Example of Control Processing

The control apparatus according to the present embodiment is capable of switching the control processing according to the above-described first example and the control processing according to the above-described second example, for example, on the basis of an operation of a user.

In addition, the control processing according to the above-described first example and the control processing according to the above-described second example may be dynamically switched on the basis of the processing load of the control apparatus according to the present embodiment or the like. In the case of switching based on the processing load of the control apparatus according to the present embodiment, the control apparatus according to the present embodiment performs the control processing according to the above-described first example, for example, in the case where the use ratio of a processor is less than a predetermined threshold (example of the case where it is not determined that the processing load is high). In addition, the control apparatus according to the present embodiment performs the control processing according to the above-described second example, for example, in the case where the use ratio of the processor is greater than or equal to the predetermined threshold (example of the case where it is determined that the processing load is high).

The control apparatus according to the present embodiment performs, for example, any of the control processing according to the first example shown in (1) above to the control processing according to the third example shown in (3) above to control each of a plurality of imaging devices.

Note that the control processing according to the present embodiment is not limited to the above-described example.

For example, when a variety of cases such as the case where the control method according to the present embodiment is applied to control over a plurality of imaging devices that image a space in which sports are played to which the control method according to the present embodiment is applicable are considered, the positions of a predetermined objects such as a player and a ball can change. Therefore, even if a plurality of imaging devices are temporarily controlled according to the control method according to the present embodiment such that each of all the predetermined objects falls within the angle of view at which at least two or more imaging devices perform imaging, the movement of the predetermined objects or the like can make it unknown where any of the predetermined objects is positioned in the predetermined area. That is, even if a plurality of imaging devices are temporarily controlled such that each of all the predetermined objects falls within the angle of view at which at least two or more imaging devices perform imaging, it can be impossible to track the predetermined objects according to the tracking processing based on captured images.

Then, for example, in the "case where it is determined that the position of at least one predetermined object among all the predetermined objects is not detected from a captured image acquired from each of a plurality of imaging devices," the control apparatus according to the present embodiment causes each of the plurality of imaging devices to enter the initial state.

For example, when a predetermined object whose position is impossible to be identified on the basis of a captured image acquired from each of a plurality of imaging devices is detected, the control apparatus according to the present embodiment determines that the position of at least one predetermined object among all the predetermined objects is not detected.

In addition, for example, when the state in which the position of at least one predetermined object is not detected continues for a set predetermined time or more (or when the state in which the position of at least one predetermined object is not detected continues beyond the predetermined time: the same applies to the following), the control apparatus according to the present embodiment may determine that the position of at least one predetermined object among all the predetermined objects is not detected. Here, examples of the above-described predetermined time include 10 [seconds], 20 [seconds], or the like. In addition, the above-described predetermined time may be a fixed time set in advance or a variable time that is changeable on the basis of an operation of a user, or the like.

As described above, providing a predetermined time from the occurrence of the state in which the position of at least one predetermined object is not detected to the determination that the position of at least one predetermined object among all the predetermined objects is not detected makes it possible to prevent an imaging device from frequently entering the initial state. Therefore, providing a predetermined time from the occurrence of the state in which the position of at least one predetermined object is not detected to the determination that the position of at least one predetermined object among all the predetermined objects is not detected makes it possible to improve the robustness.

In addition, until a predetermined time elapses from the occurrence of the state in which the position of at least one predetermined object is not detected, the control apparatus according to the present embodiment may perform any of the control processing according to the first example shown in (1) above to the control processing according to the third example shown in (3) above, for example, in the state in which a predetermined object whose position is impossible to be identified is excluded.

Figure 11B:
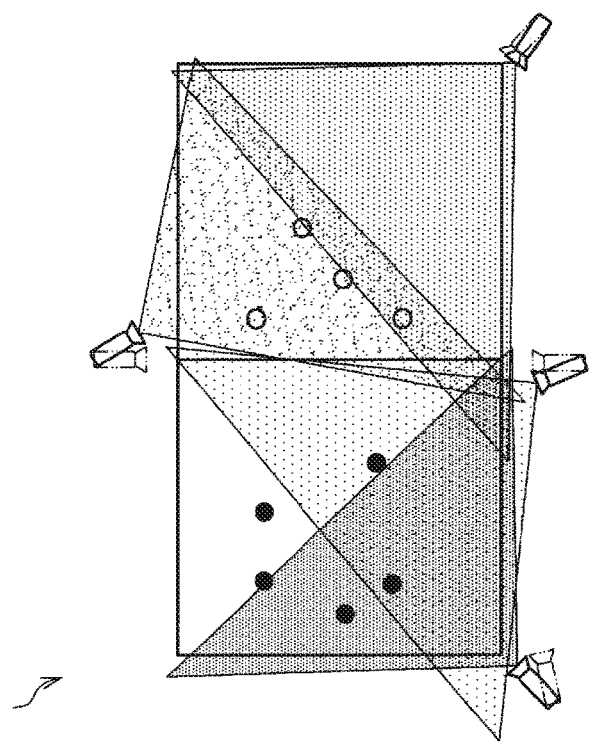
FIGS. 11A and 11B are explanatory diagrams for describing an example of initial states of a plurality of imaging devices according to the present embodiment.
Figure 11A:
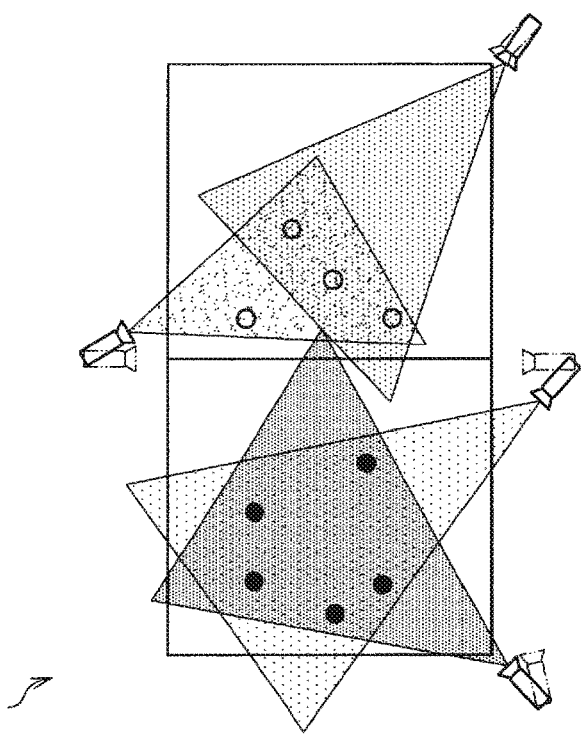

FIGS. 11A and 11B are explanatory diagrams for describing an example of the initial states of a plurality of imaging devices according to the present embodiment. FIG. 11A illustrates an example of the state in which each of all the predetermined objects is imaged by at least two or more imaging devices. In addition, FIG. 11B illustrates an example of the state in which each of a plurality of imaging devices is caused to enter the initial state.

As illustrated in FIG. 11B, in the initial state, the angle of view of each imaging device is set in a wide-angle state (wide-end state), and a plurality of imaging devices image the whole of the grounds (example of the predetermined area). Then, as illustrated in FIG. 11B, the control apparatus according to the present embodiment causes the plurality of imaging devices to enter the initial states to control each of the plurality of imaging devices such that each of all the predetermined objects detected again falls within the angle of view at which at least two or more imaging devices perform imaging.

[2-3] Example of Processing that Uses Control Processing

Next, processing that uses the control processing of the control method according to the present embodiment will be described.

Figure 12:
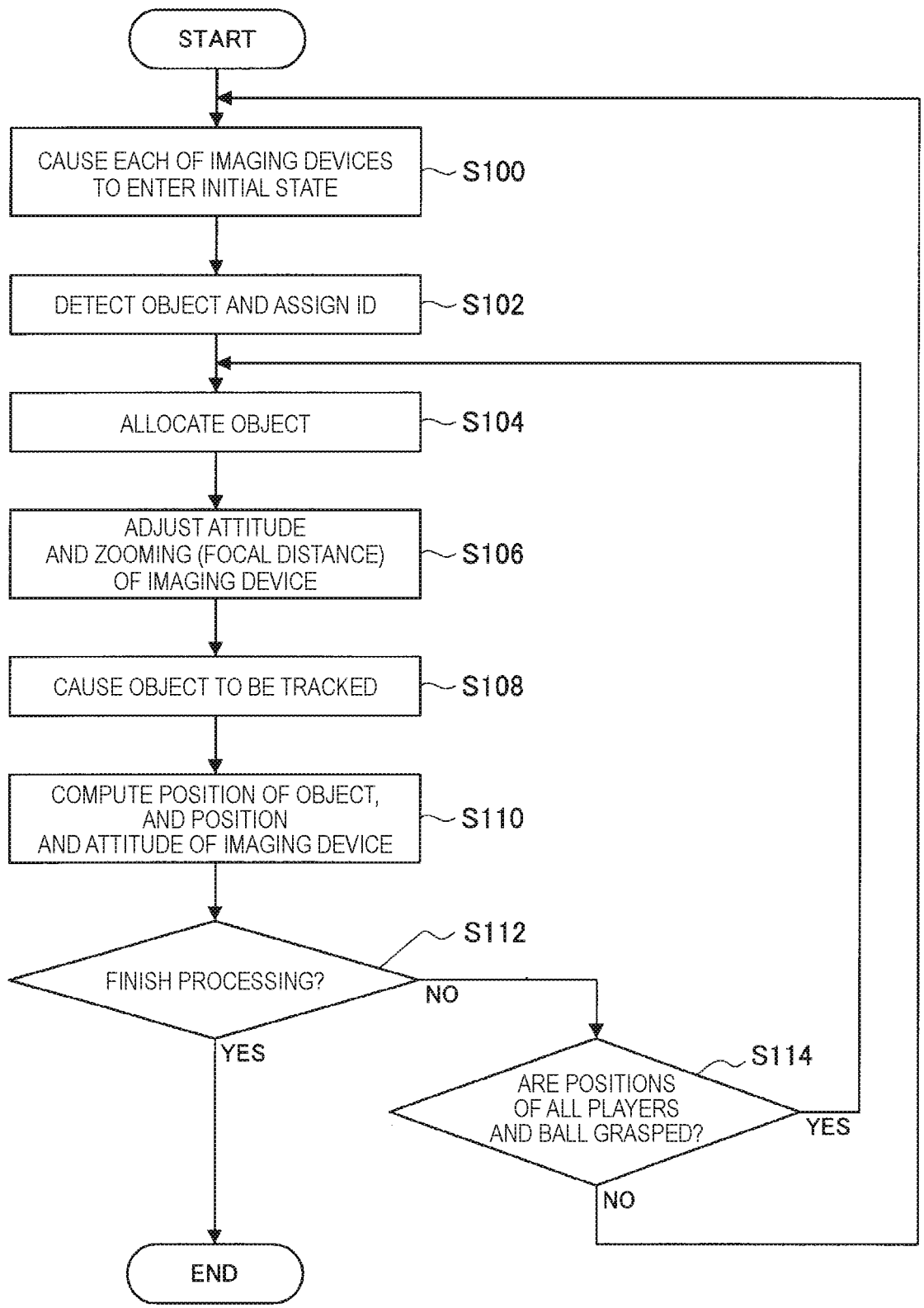
FIG. 12 is a flowchart illustrating an example of processing that uses control processing of a control method according to the present embodiment.

FIG. 12 is a flowchart illustrating an example of processing that uses control processing of the control method according to the present embodiment. FIG. 12 illustrates an example of tracking processing that uses the control processing. FIG. 12 illustrates, as an example, the case where the control method according to the present embodiment is applied to control over a plurality of imaging devices that images players and a ball (example of the predetermined objects) on grounds (example of the predetermined area) where soccer is played. Here, in FIG. 12, for example, the processing in steps S100 to S106, and S114 of FIG. 12 corresponds to an example of the control processing according to the present embodiment.

The control apparatus according to the present embodiment causes each imaging device to enter the initial state (S100). The control apparatus according to the present embodiment sets, for example, the angle of view of each imaging device in the wide-angle state as illustrated in FIG. 11B, and moves the position of each imaging device to the initial position.

The control apparatus according to the present embodiment detects a predetermined object from a captured image acquired from each imaging device, and assigns an ID to the predetermined object (S102). An ID may be automatically assigned to a predetermined object detected according to image processing that uses any object detection technology as described above, or manually assigned on the basis of an operation of a user.

The control apparatus according to the present embodiment allocates an imaging device to a predetermined object (S104). The control apparatus according to the present embodiment allocates an imaging device to a predetermined object on the basis of an evaluation value as described, for example, for the control processing according to the first example shown in (1) above and the control processing according to the second example shown in (2) above.

When, in step S104, an imaging device is allocated to a predetermined object, the control apparatus according to the present embodiment adjusts, for example, the attitude or zooming (focal distance) of each imaging device (S106). In addition, in the case where there is an imaging device whose position is changeable, the control apparatus according to the present embodiment may further adjust the position of the imaging device.

When the processing in step S106 is performed, the control apparatus according to the present embodiment performs tracking processing to cause an imaging device to track each predetermined object (S108).

The control apparatus according to the present embodiment computes the position of each predetermined object, and the position and attitude of each imaging device (S110). The position of a predetermined object is obtained, for example, with triangulation on the basis of a captured image. In addition, the position and attitude of an imaging device are obtained, for example, on the basis of one or both of a detection result of a sensor included in the imaging device and capable of use to identify the position, and a processing result of a captured image which is obtained by using structure-from-motion technology or the like.

In addition, the control apparatus according to the present embodiment may cause a storage unit (described below) or any recording medium such as an external recording medium connected to the control apparatus according to the present embodiment to record, for example, information indicating a result computed in step S110. Recording the information indicating a result computed in step S110 in the recording medium makes various kinds of analysis possible, for example, analysis of a game of sports or the like which uses the position of a predetermined object or the history of the state of an imaging device.

The control apparatus according to the present embodiment determines whether to finish the processing (S112). For example, in the case where a predetermined operation (e.g., pushing a finish button, or the like) of a user to finish the processing is detected, the control apparatus according to the present embodiment determines that the processing is finished. In addition, in the case where a predetermined event is detected on the basis of a captured image or the like, the control apparatus according to the present embodiment may determine that the processing is finished. Here, examples of the case where it is determined in step S112 to finish the processing include the case where the first half of a soccer game is finished (example of the above-described predetermined event), the case where a soccer game is finished (another example of the above-described predetermined event), or the like.

In the case where it is determined in step S112 to finish the processing, the control apparatus according to the present embodiment finishes the processing illustrated in FIG. 12.

In addition, in the case where it is not determined in step S112 to finish the processing, the control apparatus according to the present embodiment determines whether or not the positions of all the players and the ball (all the predetermined objects) are grasped (S114). For example, in the case where it is determined that the position of at least one predetermined object among all the predetermined objects is not detected from a captured image acquired from each of a plurality of imaging devices, the control apparatus according to the present embodiment determines that the positions of all the players and the ball are not grasped.

In the case where it is determined in step S114 that the positions of all the players and the ball are grasped, the control apparatus according to the present embodiment repeats the processing from step S104. In addition, in the case where it is not determined in step S114 that the positions of all the players and the ball are grasped, the control apparatus according to the present embodiment repeats the processing from step S100.

The control apparatus according to the present embodiment performs, for example, the processing illustrated in FIG. 12 as the tracking processing that uses the control processing. Note that, needless to say, the example of the processing that uses the control processing according to the present embodiment is not limited to the example illustrated in FIG. 12.

(Control Apparatus According to the Present Embodiment)

Next, an example of the configuration of a control apparatus according to the present embodiment which is capable of performing the above-described processing of the control method according to the present embodiment will be described.

Figure 13:
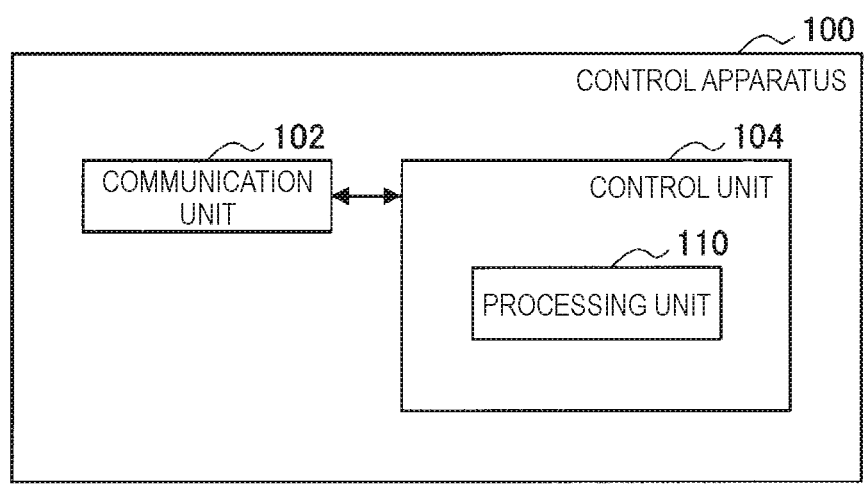
FIG. 13 is a block diagram illustrating an example of a configuration of a control apparatus according to the present embodiment.

FIG. 13 is a block diagram illustrating an example of the configuration of a control apparatus 100 according to the present embodiment. The control apparatus 100 includes, for example, a communication unit 102, and a control unit 104.

In addition, the control apparatus 100 may include, for example, a read only memory (ROM) (not illustrated), a random access memory (RAM) (not illustrated), a storage unit (not illustrated), an operation unit (not illustrated) that is operable by a user, a display unit (not illustrated) that displays various screen on a display screen, and the like. The control apparatus 100 connects, for example, the above-described components to each other by using a bus serving as a data transmission path.

The ROM (not illustrated) stores a program and control data such as arithmetic parameter used by the control unit 104. The RAM (not illustrated) temporarily stores a program and the like executed by the control unit 104.

The storage unit (not illustrated) is a storage means included in the control apparatus 100, and stores, for example, data for the control method according to the present embodiment such as a table (or a database) in which distance and size are associated, and various kinds of data such as a variety of applications. Here, examples of the storage unit (not illustrated) include a magnetic recording medium such as a hard disk, a non-volatile memory (non-volatile memory) such as a flash memory, and the like. In addition, the storage unit (not illustrated) may be attachable to and detachable from the control apparatus 100.

As the operation unit (not illustrated), an operation input device described below is included. In addition, as the display unit (not illustrated), a display device described below is included.

[Hardware Configuration Example of Control Apparatus 100]

Figure 14:
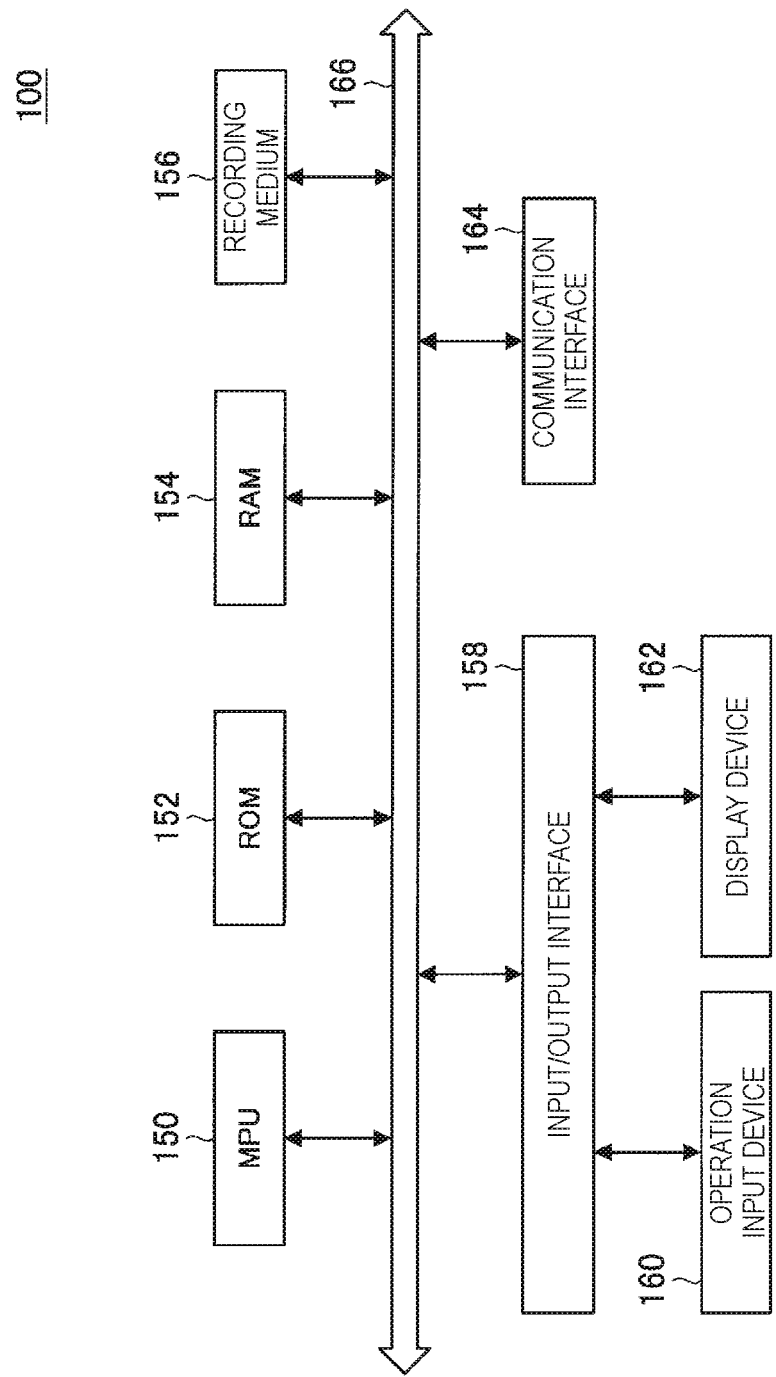
FIG. 14 is an explanatory diagram illustrating an example of a hardware configuration of the control apparatus according to the present embodiment.

FIG. 14 is an explanatory diagram illustrating an example of the hardware configuration of the control apparatus 100 according to the present embodiment. The control apparatus 100 includes, for example, an MPU 150, an ROM 152, an RAM 154, a recording medium 156, an input/output interface 158, an operation input device 160, a display device 162, and a communication interface 164. In addition, the control apparatus 100 connects, for example, the components to each other by using a bus 166 serving as a data transmission path.

The MPU 150 includes, for example, one or two or more processors including arithmetic circuits such as MPUs, various processing circuits, and the like. The MPU 150 functions as the control unit 104 that controls the overall control apparatus 100. In addition, the MPU 150 serves, for example, as a processing unit 110 described below in the control apparatus 100. Note that the processing unit 110 may include a dedicated (or general-purpose) circuit (e.g., processor or the like that is a different entity from the MPU 150) capable of implementing the processing of the processing unit 110.

The ROM 152 stores a program, control data such as arithmetic parameter, and the like used by the MPU 150. The RAM 154 temporarily stores, for example, a program and the like executed by the MPU 150.

The recording medium 156 functions as a storage unit (not illustrated), and stores, for example, data for the control method according to the present embodiment such as a table in which distance and size are associated, and various kinds of data such a variety of applications. Here, examples of the recording medium 156 include a magnetic recording medium such as a hard disk, and a non-volatile memory such as a flash memory. In addition, the recording medium 156 may be attachable to and detachable from the control apparatus 100.

The input/output interface 158 connects, for example, the operation input device 160 and the display device 162. The operation input device 160 functions as an operation unit (not illustrated), and the display device 162 functions as a display unit (not illustrated). Here, examples of the input/output interface 158 include a universal serial bus (USB) terminal, a digital visual interface (DVI) terminal, an HDMI (high-definition multimedia interface) (registered trademark) terminal, various processing circuits, and the like.

In addition, the operation input device 160 is included, for example, on the control apparatus 100, and connected to the input/output interface 158 in the control apparatus 100. Examples of the operation input device 160 include a button, a direction key, a rotary selector such as a jog dial, a combination thereof, or the like.

In addition, the display device 162 is included, for example, on the control apparatus 100, and connected to the input/output interface 158 in the control apparatus 100. Examples of the display device 162 include a liquid crystal display, an organic electro-luminescence (EL) display (which is also referred to as organic light emitting diode (OLED) display), and the like.

Note that, needless to say, the input/output interface 158 is capable of connecting to an external device such as an external operation input device (e.g., keyboard, mouse, or the like) of the control apparatus 100, and an external display device. In addition, the display device 162 may be a device, for example, touch panel or the like that is capable of display and a user operation.

The communication interface 164 is a communication means included in the control apparatus 100, and functions as the communication unit 102 that performs wireless or wired communication, for example, with an external apparatus such as a control target imaging device via a network (or directly).

Here, examples of the communication interface 164 include a communication antenna and a radio frequency (RF) circuit (wireless communication), an IEEE 802.15.1 port and a transmission/reception circuit (wireless communication), an IEEE 802.11 port and a transmission/reception circuit (wireless communication), a local area network (LAN) terminal and a transmission/reception circuit (wired communication), or the like. In addition, examples of the network according to the present embodiment include a wired network such as a local area network (LAN) and a wide area network (WAN), a wireless network such as a wireless local area network (WLAN), the Internet using a communication protocol such as TCP/IP (transmission control protocol/internet protocol), or the like.

The control apparatus 100 uses the configuration, for example, illustrated in FIG. 14 to perform the processing of the control method according to the present embodiment. Note that the hardware configuration of the control apparatus 100 according to the present embodiment is not illustrated the configuration illustrated in FIG. 14.

For example, in the case where the control apparatus 100 communicates with an external apparatus or the like via a connected external communication device, the control apparatus 100 does not have to include the communication interface 164. In addition, the communication interface 164 may be configured to be communicable with one or two or more external apparatuses or the like in a plurality of communication schemes.

In addition, the control apparatus 100 may further include, for example, an imaging device serving as an imaging unit (not illustrated).

In the case where the control apparatus 100 includes an imaging device, it is possible in the control apparatus 100 to perform the processing of the control method according to the present embodiment, for example, on the basis of a captured image generated by the imaging device performing imaging. That is, in the case where the control apparatus 100 further includes an imaging device, the control apparatus 100 may also target the included imaging device for control according to the control processing.

The imaging device includes, for example, a lens/imaging element and a signal processing circuit. The lens/imaging element includes, for example, an optical lens, and an image sensor that uses a plurality of imaging elements such as complementary metal oxide semiconductors (CMOSs). The signal processing circuit includes, for example, an automatic gain control (AGC) circuit and an analog-to-digital converter (ADC), and converts analog signals generated by the imaging elements into digital signals (image data). In addition, the signal processing circuit performs, for example, various kinds of processing for RAW development. Further, the signal processing circuit may also perform various kinds of signal processing, for example, white balance correction processing, color correction processing, gamma correction processing, YCbCr conversion processing, edge enhancement processing, and the like.

In addition, the control apparatus 100 can dispense with, for example, one or two or more of the recording medium 156, the operation input device 160, and the display device 162.

In addition, for example, a part or all of the components illustrated in FIG. 14 (or the components according to a modification) may be implemented by one or two or more ICs.

An example of the configuration of the control apparatus 100 will be described with reference to FIG. 13 again. The communication unit 102 is a communication means included in the control apparatus 100, and performs wireless or wired communication with an external apparatus such as a control target imaging device via a network (or directly). In addition, the communication of the communication unit 102 is controlled, for example, by the control unit 104.

Here, examples of the communication unit 102 include a communication antenna and an RF circuit, a LAN terminal and a transmission/reception circuit, and the like. However, the configuration of the communication unit 102 is not limited to the above. For example, the communication unit 102 can be configured to support any standard that allows for communication of a USB terminal, a transmission/reception circuit, and the like, or configured in any way that it is possible to communicate with an external apparatus via a network. In addition, the communication unit 102 may be configured to be communicable with one or two or more external apparatuses or the like in a plurality of communication schemes.

The control unit 104 includes, for example, an MPU and the like, and serves to control the overall control apparatus 100. In addition, the control unit 104 includes, for example, the processing unit 110, and takes the initiative in performing the processing of the control method according to the present embodiment.

The processing unit 110 takes the initiative in performing the control processing according to the present embodiment. The processing unit 110 controls each of a plurality of imaging devices on the basis of a captured image acquired from each of the plurality of imaging devices such that each of all the predetermined objects falls within the angle of view at which at least two or more imaging devices perform imaging. The processing unit 110 performs, for example, any of the control processing according to the first example shown in (1) above to the control processing according to the third example shown in (3) above to control each of a plurality of imaging devices.

The control unit 104 includes, for example, the processing unit 110, thereby taking the initiative in performing the processing (e.g., control processing according to the present embodiment) of the control method according to the present embodiment.

The control apparatus 100 uses the configuration, for example, illustrated in FIG. 13 to perform the processing of the control method according to the present embodiment (e.g., the above-described control processing).

Thus, configured, for example, as illustrated in FIG. 13, the control apparatus 100 is capable of causing a plurality of imaging devices to more efficiently image objects included in the predetermined area.

In addition, configured, for example, as illustrated in FIG. 13, the control apparatus 100 is capable of attaining the advantageous effects attained by performing the processing of the control method according to the present embodiment.

Note that the configuration of the control apparatus according to the present embodiment is not limited to the configuration illustrated in FIG. 13.

For example, the control apparatus according to the present embodiment can include the processing unit 110 illustrated in FIG. 13 as a different entity from the control unit 104 (i.e., implemented by another processing circuit).

In addition, as described above, the above-described control processing is obtained by dividing the processing of the control method according to the present embodiment for the sake of convenience. Therefore, the configuration for implementing the processing of the control method according to the present embodiment is not limited to the configuration illustrated in FIG. 13. It is possible to employ the configuration corresponding to the way of diving the processing of the control method according to the present embodiment.

In addition, the control apparatus according to the present embodiment may include an acquisition unit (not illustrated) that takes the initiative in performing acquisition processing according to the present embodiment. In the control apparatus according to the present embodiment, for example, the control unit 104 may include an acquisition unit (not illustrated), or the acquisition unit may be included as a different entity from the control unit 104.

In addition, in the case where communication is performed with an external apparatus via an external communication device that has a function or configuration similar to that of the communication unit 102, the control apparatus according to the present embodiment may dispense with the communication unit 102.

In addition, the control apparatus according to the present embodiment may further include an imaging unit (not illustrated) including an imaging device. In the case where the control apparatus according to the present embodiment includes an imaging unit (not illustrated), the control apparatus according to the present embodiment is capable of targeting an imaging device included in the imaging unit (not illustrated) for control according to the control processing.

The above makes description by using the control apparatus as the present embodiment. However, the present embodiment is not limited thereto. The present embodiment is applicable, for example, to various apparatuses such as a "computer including a personal computer (PC), a server, and the like," an "imaging apparatus having the imaging function of a camera used for broadcasting, a security camera, an onboard camera, or the like," a "mobile object including an automobile and the like," a "tablet type apparatus," and a "communication apparatus including a smartphone and the like" that are capable of performing the processing of the control method according to the present embodiment. In addition, the present embodiment is also applicable, for example, to a processing IC that can be incorporated into the apparatus as described above.

In addition, the control apparatus according to the present embodiment may be applied, for example, to a processing system based on a connection to a network (or communication with each apparatus) like cloud computing or the like. Examples of the processing system in which the processing of the control method according to the present embodiment is performed include a system in which one apparatus included in the processing system performs the control processing according to the present embodiment, and another apparatus included in the processing system performs other processing such as tracking processing.

(Program According to the Present Embodiment)

A program (e.g., program according to which it is possible to execute the processing of the control method according to the present embodiment such as "the above-described control processing," or "the above-described acquisition processing and the above-described control processing") for causing a computer to function as the control apparatus according to the present embodiment is executed by a processor or the like in a computer, thereby making it possible to cause a plurality of imaging devices to more efficiently image objects included in the predetermined area.

In addition, a program for causing a computer to function as the control apparatus according to the present embodiment is executed by a processor or the like in a computer, thereby making it possible to attain the advantageous effects attained by the processing of the above-described control method according to the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above shows that a program (computer program) for causing a computer to function as the control apparatus according to the present embodiment is provided. However, the present embodiment can also further provide a recording medium having the above-described program stored therein.

The above-described configuration shows an example of the present embodiment. Needless to say, the above-described configuration belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A control apparatus including:
a processing unit configured to decide, on a basis of object information indicating a state of an object, a plurality of imaging devices that image the objects such that each of all the objects included in a predetermined area imaged by the plurality of imaging devices falls within an angle of view at which the at least two or more imaging devices perform imaging, and control each of the plurality of imaging devices.

(2)
The control apparatus according to (1), in which
the processing unit decides, on a basis of one or both of the state of the object indicated by the object information, and a change in a state of the imaging device, the plurality of imaging devices that image the respective objects, and controls each of the plurality of imaging devices.

(3)
The control apparatus according to (2), in which
the processing unit allocates the imaging device to each of the objects such that each of all the objects included in the predetermined area falls within the angle of view at which the at least two or more imaging devices perform imaging, and computes an evaluation value on the basis of one or both of the state of the object and the change in the state of the imaging device, and the processing unit decides, on a basis of the computed evaluation value, the imaging device that includes each of the objects within the angle of view.

(4)
The control apparatus according to (3), in which
the processing unit decides the imaging device that includes each of the objects within the angle of view such that the computed evaluation value is highest.

(5)
The control apparatus according to any one of (2) to (4), in which
the object information indicates one or both of size of the object and a degree of concentration of the object.

(6)
The control apparatus according to (5), in which
the size of the object is obtained on a basis of image size of the object in a captured image acquired from the imaging device.

(7)
The control apparatus according to (5), in which
the size of the object is obtained on a basis of distance between the imaging device and the object.

(8)
The control apparatus according to any one of (5) to (7), in which
the degree of concentration of the object is obtained on a basis of distance between the one object and the other object.

(9)
The control apparatus according to any one of (1) to (8), in which
the processing unit groups the plurality of objects on a basis of distance between the one object and the other object, and
in a case where the objects are grouped, the processing unit controls each of the plurality of imaging devices such that each of groups of the objects falls within the angle of view at which the at least two or more imaging devices perform imaging.

(10)
The control apparatus according to (9), in which
in the case where the objects are grouped, the processing unit decides, on a basis of one or both of a state of a group of the objects which is detected on a basis of a captured image acquired from the imaging device, and a change in a state of the imaging device, the imaging device that includes each of the groups of the objects within the angle of view, and controls each of the plurality of imaging devices.

(11)
The control apparatus according to (10), in which
the processing unit allocates the plurality of imaging devices to each of the groups of the objects such that each of all the groups of the objects falls within the angle of view at which the at least two or more imaging devices perform imaging, and computes an evaluation value on the basis of one or both of the state of the group of the objects, and the change in the state of the imaging device, and
the processing unit decides, on a basis of the computed evaluation value, the imaging device that includes each of the groups of the objects within the angle of view.

(12)
The control apparatus according to (10) or (11), in which
the state of the group of the objects is one or both of size of the group of the objects, and a degree of concentration of the group of the objects.

(13)

The control apparatus according to any one of (1) to (12), in which all the objects are the objects acquired when the processing unit causes each of the plurality of imaging devices to enter an initial state in which the plurality of imaging devices image a whole of the predetermined area, the objects being detected from respective captured images.

(14)

The control apparatus according to (13), in which in a case where it is determined that a position of at least one of all the objects is not detected from a captured image acquired from each of the plurality of imaging devices, the processing unit causes each of the plurality of imaging devices to enter the initial state.

(15)

The control apparatus according to any one of (1) to (14), in which the processing unit performs, as control over each of the plurality of imaging devices, one or both of control over an imaging direction of each of the plurality of imaging devices, and control over magnification or reduction of an object in imaging performed by each of the plurality of the imaging devices.

(16)

The control apparatus according to (15), in which the processing unit further performs, as the control over each of the plurality of imaging devices, control over a position of the imaging device.

(17)

The control apparatus according to any one of (1) to (16), further including:

an imaging unit including the imaging device.

(18)

The control apparatus according to any one of (1) to (17), including:

an acquisition unit configured to acquire the object information.

(19)

A control method that is executed by a control apparatus, the control method including:

a step of deciding, on a basis of object information indicating a state of an object, a plurality of imaging devices that image the objects such that each of all the objects included in a predetermined area imaged by the plurality of imaging devices falls within an angle of view at which the at least two or more imaging devices perform imaging, and controlling each of the plurality of imaging devices.

(20)

A program for a computer to execute:

a function of deciding, on a basis of object information indicating a state of an object, a plurality of imaging devices that image the objects such that each of all the objects included in a predetermined area imaged by the plurality of imaging devices falls within an angle of view at which the at least two or more imaging devices perform imaging, and controlling each of the plurality of imaging devices.

REFERENCE SIGNS LIST 100 control apparatus
102 communication unit
104 control unit
110 processing unit

The invention claimed is:

1. A control apparatus, comprising:
a processor configured to:
group a plurality of objects in a specification area into one or more groups based on a distance between an object of the plurality of objects and remaining objects of the plurality of objects;
determine a specific camera of a plurality of cameras that includes at least one group of the one or more groups within an angle of view of the specific camera, based on a size of the at least one group and a degree of concentration of objects of the at least one group; and
control the specific camera of the plurality of cameras such that each group of the one or more groups falls within an angle of view of at least two cameras of the plurality of cameras.

2. The control apparatus according to claim 1, wherein the processor is further configured to:
determine, based on at least one of a state of the object indicated by object information, or a change in a state of at least one camera of the plurality of cameras, allocations of the plurality of cameras that image the plurality of objects.

3. The control apparatus according to claim 2, wherein the processor is further configured to:
compute an evaluation value of each of the allocations based on at least one of the state of the object or the change in the state of the at least one camera of the plurality of cameras; and
determine the specific camera among the plurality of cameras that includes each of the plurality of objects within the angle of view such that the computed evaluation value is highest.

4. The control apparatus according to claim 2, wherein the object information indicates at least one of a size of the object or the distance between the object and the remaining objects of the plurality of objects.

5. The control apparatus according to claim 4, wherein the size of the object is obtained based on an image size of the object in a captured image acquired from the at least one camera.

6. The control apparatus according to claim 4, wherein the size of the object is obtained based on distance between the at least one camera and the object.

7. The control apparatus according to claim 1, wherein
the processor is configured to determine the specific camera that includes the at least one group of the plurality of objects within the angle of view further based on a change in a state of the specific camera,
the change in the state of the specific camera comprises a weighted sum of an amount of change in a position of the specific camera relative to the specification area and the plurality of cameras, an amount of change in an attitude of the specific camera, and an amount of change in a zoom of the specific camera, and
the attitude of the specific camera comprises an orientation of the specific camera about roll, pitch, and yaw axes.

8. The control apparatus according to claim 7, wherein the processor is further configured to:
allocate the plurality of cameras to each group of the plurality of objects such that each group of the plurality of objects falls within the angle of view of the at least two cameras;

compute an evaluation value based on at least one of a state of the at least one group of the plurality of objects, or the change in the state of the specific camera; and determine the specific camera that includes each group of the plurality of objects within the angle of view based on the computed evaluation value.

9. The control apparatus according to claim 1, wherein the plurality of objects is acquired at a time in which the processor is configured to cause each of the plurality of cameras to enter an initial state in which the plurality of cameras captures a whole of the specification area, and the plurality of objects is detected from respective captured images.

10. The control apparatus according to claim 9, wherein, based on a determination that a position of at least one of the plurality of objects is not detected from a captured image acquired from each of the plurality of cameras, the processor is further configured to cause each camera of the plurality of cameras to enter the initial state.

11. The control apparatus according to claim 1, wherein the processor is further configured to control at least one of:
an imaging direction of each camera of the plurality of cameras, or
one of magnification or reduction of the object captured by each camera of the plurality of cameras.

12. The control apparatus according to claim 11, wherein the processor is further configured to control a position of the specific camera.

13. The control apparatus according to claim 1, wherein the processor is further configured to acquire object information indicating a state of the object.

14. A control method, comprising:
grouping a plurality of objects in a specification area into one or more groups based on a distance between an object of the plurality of objects and remaining objects of the plurality of objects;
determining a specific camera of a plurality of cameras that includes at least one group of the one or more groups within an angle of view of the specific camera, based on a size of the at least one group and a degree of concentration of objects of the at least one group; and
controlling the specific camera of the plurality of cameras such that each group of the one or more groups falls within an angle of view of at least two cameras of the plurality of cameras.

15. A non-transitory computer-readable medium, having stored thereon, computer-executable instructions that when executed by a processor of a control apparatus, cause the processor to execute operations, the operations comprising:
grouping a plurality of objects in a specification area into one or more groups based on a distance between an object of the plurality of objects and remaining objects of the plurality of objects;
determining a specific camera of a plurality of cameras that includes at least one group of the one or more groups within an angle of view of the specific camera, based on a size of the at least one group and a degree of concentration of objects of the at least one group; and
controlling the specific camera of the plurality of cameras such that each group of the one or more groups falls within an angle of view of at least two cameras of the plurality of cameras.

16. The control apparatus according to claim 3, wherein the processor is further configured to determine the specific camera among the plurality of cameras based on the computed evaluation value that is higher than a threshold.

* * * * *